UNITED STATES PATENT OFFICE.

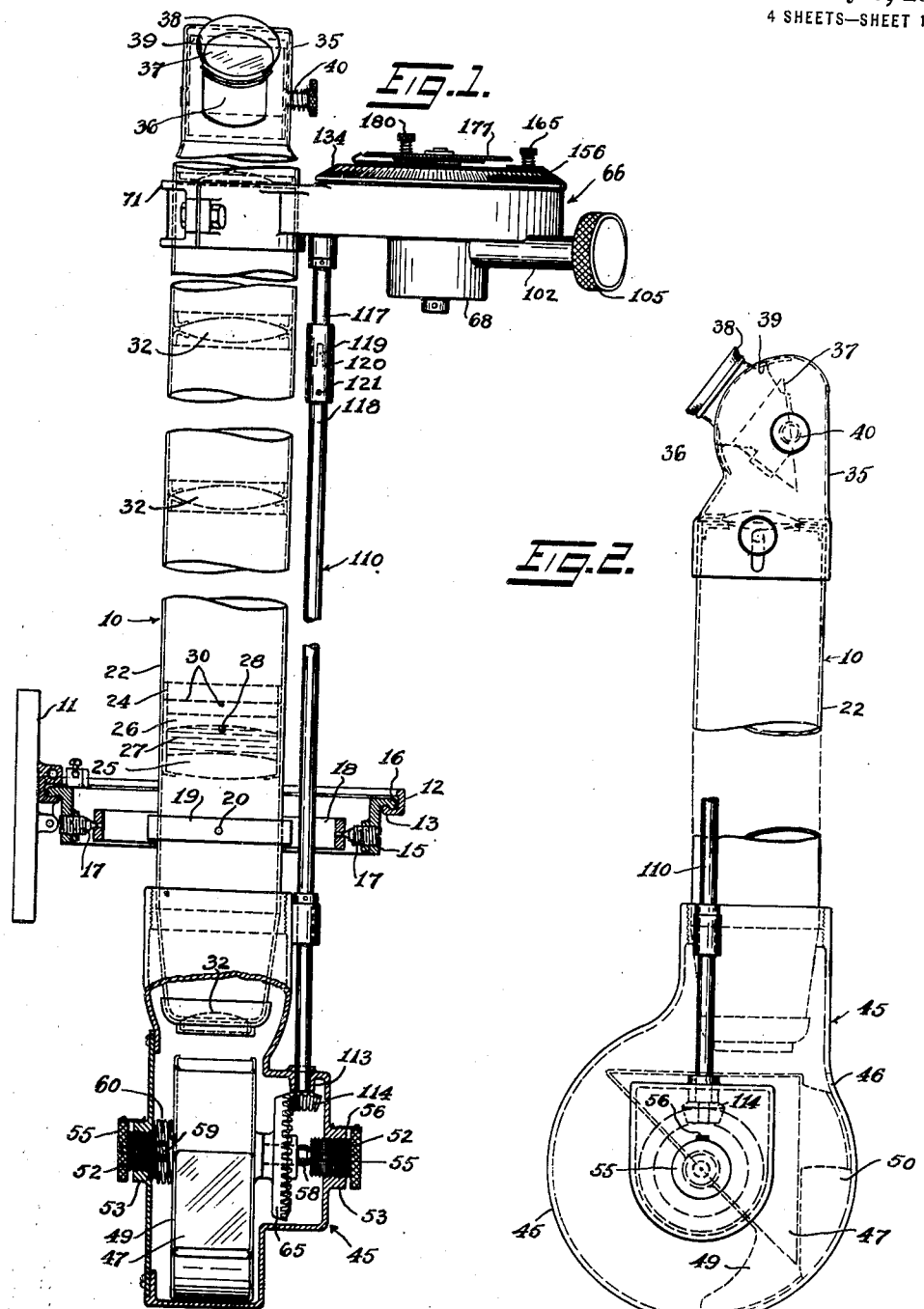

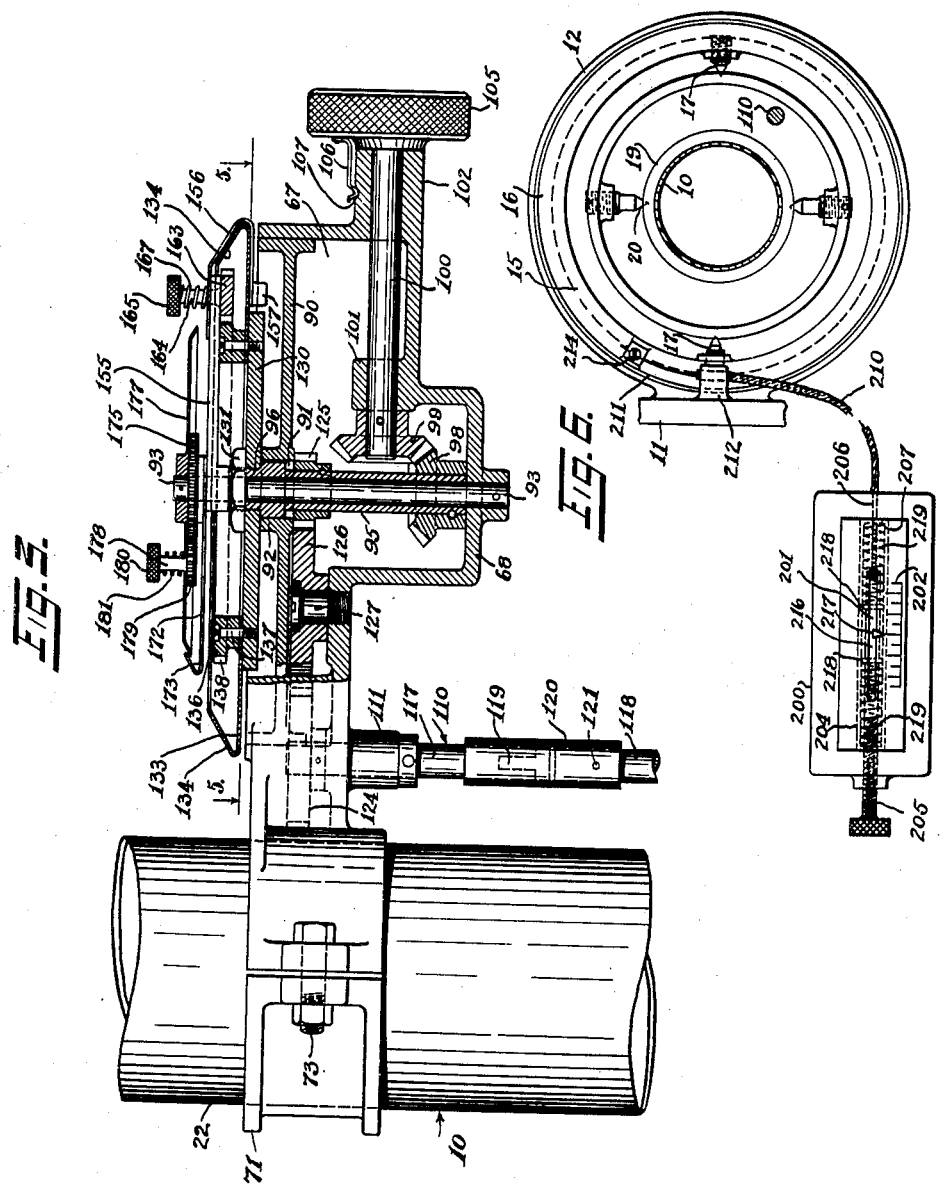

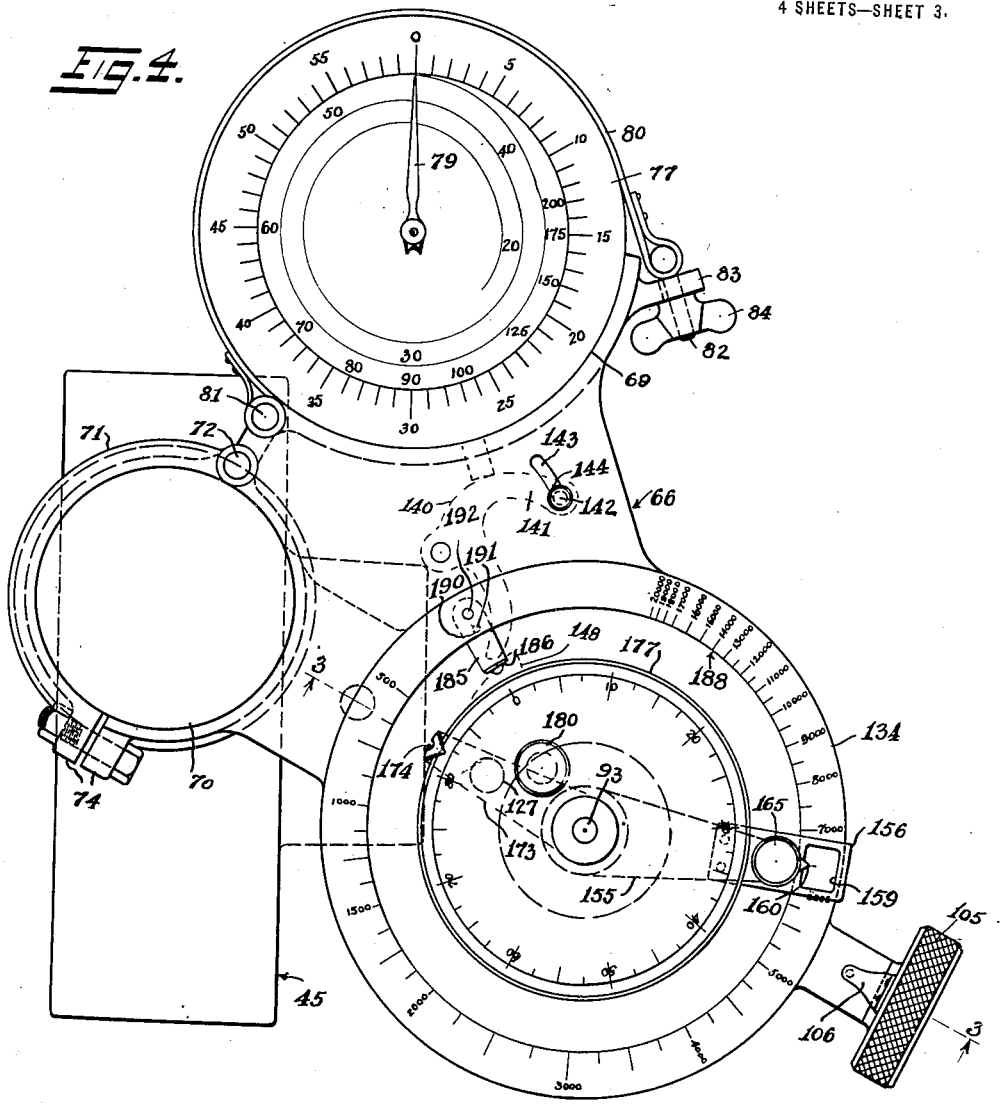

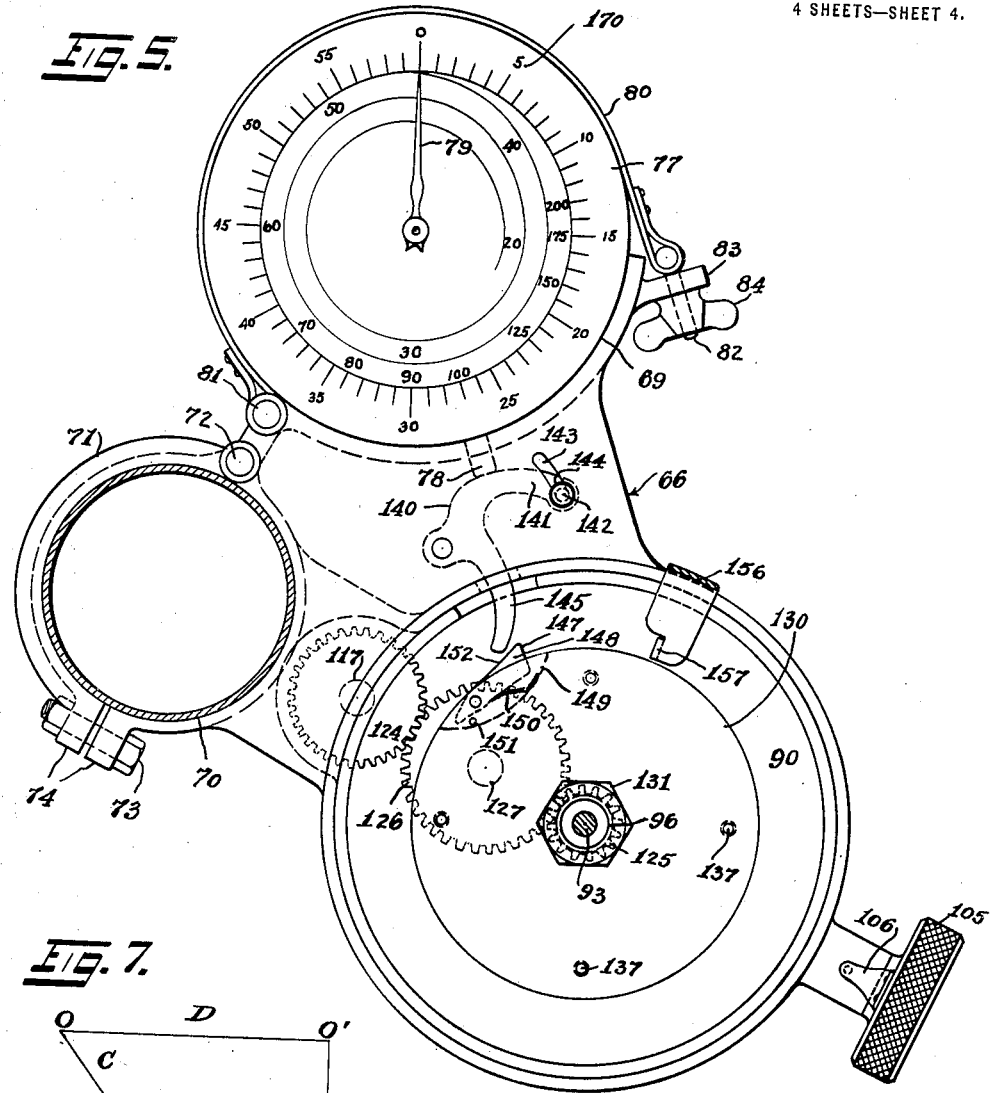

BARTON A. PROCTOR, OF NEW YORK, N. Y.

GROUND-SPEED DEVICE FOR AEROPLANES.

1,383,660.  Specification of Letters Patent.  Patented July 5, 1921.

Application filed December 13, 1918. Serial No. 266,622.

*To all whom it may concern:*

Be it known that I, BARTON A. PROCTOR, a citizen of the United States, residing in New York city, in the county of New York and State of New York, have invented certain new and useful Improvements in Ground-Speed Devices for Aeroplanes, of which the following is a specification.

This invention relates to a speed indicator for ascertaining the horizontal speed of a flying machine or the like relative to the ground, and has for one object to provide an indicator of this kind which may be easily and quickly operated, under trying conditions with the least liability of error or inaccuracy.

The speed indicator, which is usually carried on the flying machine, comprises, briefly stated, a vertically disposed telescope having a reversing prism at its lower end adapted to be gradually adjusted to reflect into the telescope rays from an object on the ground forward of the machine. The observer looks into the telescope and by gradually adjusting the prism keeps the selected object in view while the machine travels a predetermined unit distance. There are provided a chronograph, stop-watch, or any similar well-known timing instrument such, for instance, as shown in U. S. Patents Nos. 550,182 and 843,887, and a pair of adjustable starting and stopping members adapted to start and stop the stop-watch. These members are mounted on a disk operatively connected with the prism, and as the prism moves the members are brought to position to start and stop the stop-watch. The prism is held sighted on the selected object as the machine travels, and the starting member is so positioned on the disk that the stop-watch is started when the machine is in said unit distance, horizontally measured, from said object. The prism is still kept sighted on the object and the stopping member is so placed on the disk that it stops the stop-watch just as the machine is above the object and the prism is turned to view the object directly from above. The time required in traveling this unit distance may then be measured on the stop-watch.

Another object of the invention is to so construct the chronograph that not only the time elapsed between the stopping and starting may be read directly, but to so graduate the stop-watch relative to said unit distance that the speed in, for instance, miles per hour may be also read direct. Such a stop-watch may be used in connection with my indicator or alone for other purposes.

It will be seen that the adjustable stopping and starting members are relatively placed in accordance with the angle that the prism moves in keeping the selected object in view while the machine moves said unit distance. Obviously the magnitude of this angle will be greater as the horizontal path of the machine is nearer the ground; and an important object of the present invention is the provision of rapid and accurate means for adjusting said starting member as this angular magnitude varies in accordance with the altitude.

Another object of the invention is to provide means whereby, when the observer adjusts the telescope to view an object to one side of the path of the machine, directions for steering are automatically given to the pilot to enable him to steer the machine to bring its path directly over such object.

Another object of the invention is to provide means for giving a signal at the instant that a bomb or the like should be dropped to strike a given object viewed in the telescope.

These and other objects will appear as the description proceeds.

While the indicator is herein described as applied to a flying machine, it is noted that the invention is not so limited, as the indicator itself may be useful even when not carried on moving objects, and certain features thereof may be used for purposes not related to speed indicators. Also many changes may be made in the construction and use of the indicator without departing from the scope of the invention as claimed.

In the accompanying drawing, showing, by way of example, one of many possible embodiments of the invention, Figure 1 is a rear elevation of my improved speed indicator;

Fig. 2 is a side elevation of the same, parts being broken away;

Fig. 3 is an enlarged fragmental rear elevation, partly in section, approximately on the line 3—3 of Fig. 4;

Fig. 4 is a plan view of the principal controlling mechanisms of the speed indicator;

Fig. 5 is a plan view partly in section of said mechanisms;

Fig. 6 is a plan view showing the direction indicator; and

Fig. 7 is a diagram explaining the operation of the indicator.

The lower end of the telescope 10, is supported for universal movement in the lower part of the car of the flying machine. The supporting means comprises a fixed bracket 11, secured to some convenient part of the car and provided with a fixed ring bracket 12, having an inturned lip 13 forming an annular seat. Within this ring there is provided a rotatable ring 15 provided with an outturned lip 16, engaging in said seat and adapted for rotary movement relative thereto for a purpose which will be explained. At the inner face of said rotatable ring there are provided a pair of alined diametrically oppositely disposed inwardly pointing trunnion pins 17 on which is movably mounted the intermediate ring 18. Within this intermediate ring there is disposed an inner ring 19 mounted to rock upon pins 20 on said inner ring, and on the axis of movement at right angles to the axis of movement of said intermediate ring.

Within said inner ring 19, is fixed the lower part of the tubular casing 22. Within a convenient part of the telescope casing there is disposed a lens casing 24 having a lower lens 25 in the lower part thereof and an upper lens 26 in the upper part thereof. The lower face of the upper lens is concaved and has its highest point in the axis of the telescope.

Inclosed between said lenses is a suitable liquid 27 of such refractive power as to form with said upper lens a neutral optical element. Within said liquid there is an air bubble or the like 28 adapted, when the telescope is vertical, to dispose itself in the axis of the telescope for leveling the telescope. Above said upper lens is disposed a pair of crossed filaments 30, secured to the inner face of the lens casing 24 and forming a crossed-line device having its intersection in the axis of the telescope. Said intersection is placed as near as possible to said bubble in order that they may both be in the same intermediate focus of the telescope and may be viewed together to insure that the air bubble is exactly in the axis of the telescope thereby to assure that this axis is exactly vertical.

The telescope is provided with a plurality of suitable lenses 32 forming with the lens 25 an unreversing telescopic system having said bubble in said intermediate focus thereof.

At the upper part of the tubular casing 22, there is provided an upper housing 35 forming a portion of the cylinder having an opening 36 in its upper and rear part. An upper reversing prism 37 of the well-known type of reversing prisms disposed in said housing, is adapted to receive and reverse rays from said telescope and to reflect them through the eye-piece 38 of the movable sheath 39 in which said prism is supported.

Journals 40 are provided for rotatably supporting said sheath in said upper housing and in a horizontal axis which may be transversed to the normal path movement of the flying machine.

At the lower end of the tubular casing there is fixed a lower housing 45, forming a portion of a cylinder and having an arcuate opening 46 in its forward and lower part. In said lower housing there is disposed a lower reversing prism 47 adapted to receive rays coming into said opening 46 and to reflect them into the telescope. A lower sheath 49 supports said lower prism and is provided with a light inlet opening 50 adapted to register with said arcuate opening and to receive the light rays, which rays are in turn reflected by the prism into the telescope.

At the sides of said lower housing there are provided journal bearings 52 having threaded engagement in bosses 53 formed in the side wall of the housing. The axes of these journal bearings are disposed in the axis of the cylindrical portion of the lower housing and are horizontally transverse to the normal path of the flying machine. Each of these journal bearings is provided with a milled adjusting head 55 on which is mounted a small spring 56 adapted to engage the boss 53 to hold the journal bearings in adjusted position. Each journal bearing is provided with an axial bore in which engage the pointed ends of one of journal shafts 58 and 59 secured to and supporting the lower sheath 49. Surrounding one journal shaft 58 is disposed a coiled spring 60 having its opposite ends secured to said sheath 49 and the lower housing respectively, and tending to move the prism to the position shown in Fig. 2. Upon the journal shaft 58 is mounted a large bevel gear 65, hereafter to be mentioned.

Upon the upper end of the tubular casing 22 there is mounted a supporting bracket 66 forming a gear housing 67 having a closed lower wall 68 (Fig. 3) and provided with a concaved recess 69 (Fig. 5) and a semicylindrical recess receiving the upper part of the tubular casing. A strap piece 71 partially surrounding the tubular casing is hinged to the bracket 72 and has its opposite end secured thereto by means of a clamping bolt 73 passing through coöperating lugs 74 and the bracket and strap-piece respectively, thereby holding the bracket in place on the casing.

In said concaved recess 69, there is mounted a timing instrument or stop-watch 77 provided with a push button 78 for stopping and starting the stop-watch. The interior mechanism of the stop-watch may be of any desired or well-known construction and is such that the first pressure on the push button 78 zeroizes the stop-watch and second pressure starts the stop-watch, while a third pressure stops the same, so that the amount of movement of the hand 79 registers to the time elapsed between said starting and stopping.

The stop-watch is held in place by means of the strap 80 partially surrounding the stop-watch and pivoted to the supporting bracket 81. The free end of said strap is secured to a retaining bolt 82 passed through a lug 83 on the supporting bracket and held in place by means of a nut 84.

In the upper part of the housing 67 (Fig. 3) there is secured a top wall 90 provided with a central opening 91 surrounded by a boss 92. In the lower wall 68 of said housing there is fixed a fixed shaft 93 projecting a distance through said central opening. Upon said fixed shaft there is rotatably mounted a rotatable sleeve 95 resting on the lower wall of the housing and having its upper end rotatably fitting in said central opening 91, and provided with a threaded extension 96. Upon the lower part of said sleeve there is fixed a bevel gear 98 meshing with a similar gear 99 mounted upon the horizontal actuating shaft 100 rotatably mounted in a bearing lug 101 in the interior of the housing and a bearing boss 102 on the outer edge of the housing.

Upon said actuating shaft is mounted a milled actuated head 105 on which is mounted a spring piece 106 provided with a projection adapted to engage in a depression 107 on the boss 102. This spring serves to give a slight jolt to the actuating head when the spring engages in the depression, so as to indicate the normal stopping position of the actuating head.

A connecting spindle 110 has its upper end rotatably mounted in a boss 111 (Fig. 3) on the lower face of the supporting bracket 66, and said end projects into the interior of the housing 67. The lower end of the spindle 110 rotates in a bearing boss 113, Fig. 1, in the housing 45, and is provided with a lower bevel gear 114, meshing with the large gear 65. For assembling and disassembling the indicator, the connecting spindle 110 is formed of upper and lower alined sections 117 and 118 (Fig. 3) having their adjacent ends spliced together at 119, and held in alinement by the coupling sleeve 120 secured to the lower section 118 by means of a pin 121.

Upon the upper end of the upper section 117 there is fixed a spur gear 124, and there is also fixed a spur gear 125 near the upper part of the sleeve 95. These two spur gears are operatively connected by an intermediate gear 126 rotatably mounted on the stub shaft 127 mounted in the lower wall of the gear housing.

It will thus be seen that there is an operative connection between the rotary sleeve 95 and the lower prism 47. The sizes of the various gears are so selected that any amount of rotation of the sleeve constrains the lower prism to rotate one-eighth of that amount.

Upon said threaded extension 96 (Fig. 3) of the rotary sleeve, there is supported a circular disk support 130 having threaded engagement and support on said threaded extension. A nut 131 locks the disk in place. Upon said disk support, there is supported an altitude disk 133 having an upwardly and inwardly graduated flange 134.

Upon said altitude disk there is provided a gear ring 136 secured to the disk support by means of screws 137. Said gear ring is provided at its upper part with an outwardly projecting tooth flange 138.

Fulcrumed upon the lower face upon said supporting bracket 66, (Fig. 5), is an elbow lever 140 adapted when operated to press its active arm 141 against said push button 78.

Upon said active arm there is provided a supporting stem 142 projecting through an arcuate slot 143 in the bracket and provided with a manipulating button 144 by means of which the stop-watch may be zeroized, or started or stopped independently of the operation of the indicator as a whole. The motive arm 145 of the elbow lever is adapted to be operated by a forward shoulder 147 of the operating pawl 148 pivotally mounted in a pawl receiving recess 149 of the disk support 130. The active end of the pawl is pressed out by means of a spring 150 and its movement is limited by means of a limiting pin 151. Said pawl is provided with a cam face 152 adapted to cam over said motive arm 145, if for any reason the pawl should be moved rearwardly.

The operating pawl 148 has for its object to stop the stop-watch by pressing upon the motive arm of the elbow lever; and the pawl and the operative connections between the disk support and the lower prism is such that when said lower prism reflects into the telescope vertical incoming rays, said forward shoulder 147 brings about the stopping of the stop-watch.

Upon the upper part of said fixed shaft 93 (Fig. 3) there is loosely mounted a pointer arm 155 having its outer end extending over the tooth flange 138. Upon the upper face of the outer end of said pointer arm there is secured a bent plate 156, bent over, around, and under said flange 134, and formed at its lower part with a starting lug 157, adapted to engage said motive arm 145 of the elbow lever for starting the stop-watch. Said plate 156 (Fig. 4) is formed with a cut-away portion 159 forming an altitude pointer 160 disposed over said graduated flange 134. For adjustably moving said altitude pointer around the graduated flange, there is provided an operating pinion 163 (Fig. 3) meshing with said toothed flange and provided with a stem 164 rotatably mounted in the outer end of the pointer arm and having a milled head 165 by means of which a pinion may be rotated to cause said pointer arm and pointer to revolve relative to the graduated flange 134.

When it is desired to move the pointer flange quickly, without accurate adjustment, the operating pinion is pressed downwardly against the action of the coiled spring 167, compressed between plate 156 and the manipulating head. This movement entirely disengages the pinion from the tooth flange and permits the pointer arm to be moved to any desired approximate location; and on reaching this location the pinion may be allowed again to come in mesh with the toothed flange for the final adjustment.

In practice it is desired that the starting lug 157 and the pointer 160 be so adjusted that the lug engages the elbow lever 140 and starts the stop-watch when the flying machine is a certain selected horizontal unit distance, for instance 4000 feet from some prominent selected object which the observer selects.

Referring to the diagram of Fig. 7, suppose the observer is a short distance to the left of and moving toward the point O at the altitude H above the selected point P, said point O being a selected horizontal distance D from the vertical passing through the point P. When the observer is thus at the left of point O, he adjusts the lower prism so that the point P shows at the intersection of the crossed-line device. The observer, by manipulating the actuating head 105, continues to hold said intersection upon the point P, as the machine moves toward the points O and O'.

The starting lug 157 is so adjusted relative to the altitude disk 133, that when the point O is reached the starting lug 157 engages the lever 140, and starts the stop-watch. The machine continues to move until the point O' is reached, whereupon the shoulder 147 (Fig. 5) engages the elbow lever and stops the stop-watch. It is evident then that the machine has traveled the distance D, while the stop-watch is running, and that while the machine is moving this distance, the light rays received by the prism will have moved from the inclination of the line O P to the vertical, and said rays will have therefore revolved a distance equal to the angle A.

Since the line of the distance D is horizontal and the line H is vertical, the angle O' is a right angle, and $$\text{Cotangent of } A = \frac{H}{D}$$

Therefore $H = D$ (cotangent of A).

If H is greater, the cotangent of A, and therefore the angle A', is greater, while D always remains constant. In other words, the angle A varies when the altitude H varies, and if the altitude H is known, since D is fixed, the angle A can be found, it is therefore necessary to know the altitude, and this the observer finds by means of a barometer or other convenient method.

In order to save the trouble of reference to tables, the graduated flange 134 of the altitude disk is graduated in altitudes so arranged that when the altitude pointer is set at a given altitude H, as marked on the flange, the rays entering the lower prism will move through the angle A while the prism moves only half that much. As the altitude disk moves eight times the amount of the prism, and therefore only four times the angular amount of said rays, instead of graduating the disk proportionally to the cotangent of the angular movement of the disk between the starting and stopping of the chronograph, the angular graduations on the altitude disk are designated by numerals proportional to ¼ the cotangent of the angular movement of the disk.

Therefore, the peripheral flange 134 of the altitude disk must be graduated in numerals of altitude measure, approximately equal to the cotangent of the angle A multiplied by the distance D, in the present case 4000 feet, and since the angle A must be represented by an angle four times the angle A upon the graduated flange 130, said flange must be graduated in numerals approximately equal to the cotangent of ¼ the angular distance between the lug 157 and the altitude 147, this angle being measured in a clockwise direction as shown in Fig. 5. When the numerals of altitude are thus arranged they represent the graduation at which the altitude pointer is set to cause the starting of the stop-watch, when said altitude disk and lower prism are in position to cause to be shown at said intersection of the crossed-line device, an object selected a distance ahead of the machine equal to said selected unit distance.

Since the stop-watch runs only during the time that it takes the flying machine to travel said unit distance, the speed can be calculated from the reading of the stop-watch; but in order to eliminate the necessity of calculating, the stop-watch is graduated with speed numerals 170 representing the speed at which the machine would move in order to travel said unit distance during the time elapsed while the hand 97 of the chronograph moves from its zero point to the indicated speed numeral indicated by the hand 97 when the chronograph is stopped.

My improved instrument may be used also for indicating the angle at which an object, for instance, a bomb should be dropped in order to fall upon an object at the time viewed upon the intersection of the crossed-line device of the instrument. The means for accomplishing this will now be described.

Upon the upper part of the fixed shaft 93 (Fig. 3) there is provided an angle pointer 172 loosely mounted on the fixed shaft and provided with an upwardly and inwardly projecting end 173, the bent portion of which is provided with a notch 174 (Fig. 4). A gear wheel 175 is loosely mounted upon said shaft and is fixed to the angle pointer.

Above said gear wheel, a fixed angle disk 177 is fixed to said shaft 93, and provided with an eccentric opening adapted to receive the stem 178 of a pinion 179 meshing with said gear 175. Upon said stem 178 is mounted a manipulating head 180 between which and said fixed disk is compressed a spring 181. The manipulating head 180 is used for adjusting the angle pointer 172.

On the inner face of the graduated flange 134 there is pivotally mounted a yieldable snap member 185 provided with an upwardly pointing yieldable finger 186, adapted to snap into the notch 174 when said finger moves into registery with said notch. The snap member is located directly over the shoulder 147 of the pawl 148, since this is a position where it will never interfere with the adjustment of the starting lug 157.

The observer can by consulting his tables and charts decide at which angle, in view of his speed and altitude and the speed and direction of the wind and other conditions, he should drop his bomb. He then sets the angle pointer 172, so that the snap member 85 will snap into said notch just as the machine reaches that angle relative to the object. Therefore the graduations 188 of the angle disk are arranged at such position that they will measure the angle between the axis of the telescope and the light rays reflected by the lower prism into the telescope.

When the snap member 85 is not in use, it is desirable that it be folded out of the way under the flange 134, therefore the member is provided with a projection 190 adapted to engage in a small opening 191, in said flange to hold the snap member in operative position. When not in use the member may be forced back under the flange by rotating on the pivot 192.

In practice it often happens that it is desired to sight the telescope upon some object at one side of the path of the machine, and means are provided for automatically communicating a signal to the pilot of the machine to cause him to steer the machine so that its path will be above the selected object.

This means is shown in Fig. 6, and will now be described. A guide block 200 is provided with a longitudinal slot 201 having graduations 202 adjacent thereto. A bore 204 passes longitudinally through said block in connection with said slot, and has one end threaded for the reception of the adjustable screw plug 205 which forms one end wall of the bore. The other end of the bore is reduced to form an extension bore 206 and an inner shoulder 207.

A flexible cable 210 is provided having an outer sheath and an inner wire 211. The opposite ends of said outer sheath are secured respectively in said extension 206 and a lug 212 on the fixed bracket 11. The outer end of the wire 211 is secured to a perforated piece 214 on the rotatable ring 15, while the inner end of the wire is secured to a sliding piece 216 slidable in said bore and provided with an indicator 217 movable over said graduations 202. Said sliding piece is also provided with a pair of guide collars 218 between each of which and said end wall and shoulder 207 respectively are compressed a pair of spiral springs 219.

The lengths of the sheath and inner wire of the flexible cable 210 are such that when the intersection of the crossed-line device is sighted on an object directly forward of the machine, the indicator 217 will indicate the mid-position of the graduations 202, but if the telescope should be rotated on its own axis, as permitted by rotation of the ring 14 on the lip 13 (Fig. 1), the indicator 217 will be moved to one side of the mid-position, thus indicating to the pilot when he must steer his machine in the one direction or the other until he brings the indicator to its mid-position. This arrangement may be used not only for guiding the machine in the proper direction for taking speed or for bombing, but also by the observer for signaling to the pilot to steer the machine in any desired horizontal direction or over any desired object.

The operation of the instrument is as follows:

The observer first by means of any suitable means or method, as for instance, a barometer, ascertains his altitude, and then by means of the milled head 165 sets the starting lug 157 in accordance with the numerals of altitude measure indicated on the flange 134.

The stop-watch having been zeroized by manipulating the button 144 (Fig. 5), the observer holds the telescope in his hand and by sighting on the crossed-line device and the level bubble, maintains the telescope in vertical position. He then selects some prominent object in or near the direction in which the machine is traveling and by rotating the telescope, and the prism, through the instrument of the actuating head 105, keeps said intersection on the selected object.

The pilot observes the indicator 217, and if the machine is not moving directly toward the object, he steers the machine until the indicator 217 moves to its mid-position. During this time the observer has been slowly turning the actuated head and holding the object upon the crossed-line device, this being easy since the coiled spring 60 (Fig. 1) tending to move the lower prism to the position of Fig. 2, takes up any lost motion between the prism and the actuating head 105 and furnishes enough resistance to steady the hand of the observer. As the observer continually turns the actuating head 105, the starting lug 157 approaches the elbow lever 140 and just as the machine reaches said selected unit distance from the vertical of the selected point, the starting lug 157 trips the elbow lever and starts the stop-watch.

The stop-watch then continues to run until the shoulder 147 of the pawl again trips the elbow lever and stops the stop-watch, whereupon the speed, for instance, in miles per hour, is read directly from the stop-watch.

After the speed has been ascertained, the observer taking this speed and the altitude into consideration together with other data necessary for determining the angle at which the bomb or the like should be dropped, sets by means of the milled head 180 the pointer 172 at the indicated angle on the fixed angle disk. He then sights the intersection of the crossed-line device upon the object to be bombed by manipulating the actuating head 105 as has been described. He then keeps said intersection upon the object by slowly turning the actuating head until he feels the finger 186 snap into the notch 174, at which instance he causes the bomb to be dropped. He may then turn the instrument to normal position which is the position indicated in Fig. 2 and at that instant feels the spring 106 snap into the depress and knows, without looking at the altitude disk, that the normal position has been reached.

I claim:

1. In combination, a sighting instrument adapted to be sighted at different angles; a timing apparatus; adjustable means controlled by said instrument and adapted to start and stop the timing apparatus when the instrument is sighted at different angles; and graduations indicating how said means are adjusted to cause the starting and stopping of said apparatus when, while said instrument is held sighted on a given object, a selected unit distance of travel takes place between the object and the instrument.

2. In combination, a sighting instrument adapted to be adjusted to receive light rays at different angles; a timing apparatus; a movable graduated member operatively connected with the instrument; a pair of relatively adjustable means on said member adapted to start and stop the timing instrument when rays are received into the instrument at different angles; the graduations of said member being designated by numerals indicating the relative distance at which the means are set to cause the starting and stopping of the timing apparatus when, while said instrument is held sighted on a given object, it travels a selected unit distance relative thereto.

3. In a speed indicator, the combination of a sighting instrument adapted to be adjusted to receive light rays at different angles; a timing apparatus; a movable graduated member operatively connected with the instrument; a shoulder on said member adapted to stop the timing apparatus when rays of one angle are received into the instrument; a stop adjustable relative to the graduations and adapted to start the timing apparatus when rays of a second angle are received; the graduations of said member being designated by numerals indicating the graduation at which the stop is set to cause the starting of the timing apparatus when said instrument is held at said second angle and is sighted on an object a selected distance ahead of where the object will be when rays from it are received at the first named angle.

4. In a speed indicator, the combination of a rotatably mounted sighting instrument adapted to sight at different angles; a timing apparatus; a movable graduated member operatively connected with the instrument; a means on said member adapted to stop the timing apparatus when the instrument points at a determined angle; a stop adjustable relative to the graduations and adapted to start the timing apparatus when the instrument sights at another angle, the graduations of said member being approximately proportional to the cotangent of the angular difference of said angles.

5. In a speed indicator, the combination of a sighting instrument having a rotatably mounted reflector; a timing apparatus; a rotatable graduated member operatively connected with the reflector; a shoulder on said member adapted to stop the timing apparatus when the rays of a determined angle are reflected into the instrument; a stop adjustable relative to the graduations and adapted to start the timing apparatus when rays of another angle are reflected into the instrument; the graduations of said member being approximately proportional to the cotangent of the angular difference of said angles.

6. In a speed indicator, the combination of a sighting instrument having a reflector rotatably mounted to move in a vertical plane; a timing apparatus; a rotatable graduated member operatively connected with the reflector; a shoulder on said member adapted to stop the timing apparatus when the rays of a determined angle are reflected into the instrument; a stop adjustable relative to the graduations and adapted to start the timing apparatus when rays of another angle are reflected into the instrument; the graduations of said member being designated by numerals of altitude measure approximately proportional to the cotangent of the angular difference of said angles.

7. In a speed indicator, the combination of a telescope; a reflector rotatably mounted on the telescope; a timing apparatus; a rotatable graduated member operatively connected with the reflector; a shoulder on said member adapted to stop the timing apparatus when rays of a determined angle are reflected into the telescope; a stop adjustable relative to the graduations and adapted to start the timing apparatus; the graduations of said member being designated by numerals of altitude measure approximately proportional to the cotangent of the apparent angular movement of the reflected rays.

8. In a speed indicator, the combination of a telescope; a reflector rotatably mounted on the telescope; a timing apparatus; a rotatable graduated member operatively connected with the reflector; a shoulder on said member adapted to stop the timing apparatus when rays of a determined angle are reflected into the telescope; a stop adjustable relative to the graduations and adapted to start the timing apparatus; the graduations of said member being designated by numerals of altitude measure approximately proportional to the cotangent of the apparent angular movement of the reflected rays, said numerals indicating the graduation at which the stop is set to cause the starting of the timing apparatus when said telescope shows an object a selected linear unit of distance ahead of where the object will be when its rays are reflected into the telescope at said determined angle.

9. In a ground speed indicator for flying machines, the combination of a telescope; a reflector rotatably mounted on the lower end of the telescope; a timing apparatus having speed graduations; a disk operatively connected with the reflector and provided with graduations; a shoulder on said disk adapted to stop the timing apparatus when vertical rays are reflected into the telescope; a stop adjustable on said disk and adapted to start the timing apparatus and associated with said graduations; said graduations being designated by numerals of altitude measure proportional to the cotangent of the angular movement of said incoming rays and indicating the graduation at which the stop is set to cause the starting of the timing apparatus when said disk and lower prism are in position to cause to be shown an object a distance ahead of the machine equal to a selected linear unit of distance.

10. In a ground speed indicator for flying machines, the combination of a telescope; a crossed line device in a focus of said telescope; a reflector rotatably mounted on the lower end of the telescope; a timing apparatus having speed graduations and provided with a push button; a rotatable disk operatively connected with the reflector; a shoulder on said disk adapted to operate said button to stop the timing apparatus when vertical rays are reflected into the telescope; a stop adjustable on said disk and adapted to operate the push button to start the timing apparatus and provided with a pointer adjacent to the periphery of the disk, the periphery of said disk being graduated in numerals of altitude measure approximately equal to the cotangent of one-fourth the angular distance between said shoulder and said stop measured in a clockwise direction and multiplied by a selected linear unit of distance.

11. In a ground speed indicator for flying machines, the combination of a telescope; a crossed-line device in a focus of said telescope; a reflector rotatably mounted on the lower end of the telescope; a timing apparatus having speed graduations and provided with a push button; a rotatable disk operatively connected with the reflector; a shoulder on said disk adapted to operate said button to stop the timing apparatus when vertical rays are reflected into the telescope; a stop adjustable on said disk and adapted to operate the push button to start the timing apparatus and provided with a pointer adjacent to the periphery of the disk, said numerals indicating the graduation at which the pointer is set to cause the starting of the timing apparatus when said disk and lower prism are in position to cause to be shown, on the intersection of the crossed-line device, an object a distance ahead of the machine equal to said selected linear unit of distance.

12. In a ground speed indicator for flying machines, the combination of a telescope; a reflector rotatably mounted at the lower end of the telescope; a timing apparatus provided with speed graduations and a push button; a rotatable altitude disk operatively connected with the reflector; a shoulder secured to said disk adapted to operate said button to stop the timing apparatus; a stop adjustable on said disk and adapted to operate the push button to start the timing apparatus and provided with a pointer adjacent to the periphery of the disk; the periphery of said disk being graduated in numerals of altitude measure approximately equal to the cotangent of one-fourth the angular distance between said shoulder and said stop measured in a clockwise direction and multiplied by a selected linear unit of distance, said numerals indicating the graduation at which the pointer is set to cause the starting of the timing apparatus when said altitude disk and lower prism are in position to cause to be shown, in said telescope, an object a distance ahead of the machine equal to said selected linear unit of distance.

13. In a ground speed indicator for flying machines, the combination of a reflector; a disk operatively connected to said reflector and having a shoulder and gear teeth; an arm formed with a lug, and a pointer disposed over said disk; an operating pinion meshing with said teeth and provided with a stem rotatably mounted in said arm and having a head; a spring compressed between said arm and head; and timing means operated by said lug and shoulder.

14. In a ground speed indicator for flying machines, the combination of a reflector; a shaft; a disk on said shaft and operatively connected to said reflector and having a shoulder; a gear ring on said disk; a pointer arm loosely mounted on said shaft and extending over said ring and formed with a lug and a pointer disposed over said disk; an operating pinion meshing with said ring and provided with a stem rotatably mounted in the outer end of said pointer arm and having a milled head; a coiled spring on said stem compressed between said plate and head; and a contact member adapted to be contacted by said lug and shoulder.

15. In a ground speed indicator for flying machines, the combination of a telescope; a reflector rotatably mounted on the telescope; a timing apparatus; a fixed shaft; a disk supported on said shaft and operatively connected to said reflector and having a graduated edge; a gear ring on said disk and provided with a toothed flange; a shoulder on said disk and adapted to stop the timing apparatus; a pointer arm loosely mounted on said shaft; a plate secured to said arm and formed with a lug to start the timing apparatus and with a pointer associated with said edge; a pinion yieldably held in mesh with said toothed flange and provided with a stem rotatably mounted in the pointer arm.

16. In a ground speed indicator for flying machines, the combination of a telescope; a reflector rotatably mounted at the lower end of the telescope; a supporting bracket on said telescope; a timing apparatus on the bracket; a fixed shaft on said bracket; a disk support supported on said shaft and operatively connected to said reflector; an altitude disk on said support and having a graduated edge; a gear ring secured on said disk and provided with an outer toothed flange; a shoulder on said support for stopping the timing apparatus; a pointer arm loosely mounted on said fixed shaft and extending over said toothed flange; a bent plate secured to the outer end of said pointer arm and disposed over, around, and under said edge and formed with a lug adapted to start the timing apparatus and with a pointer disposed over said edge; an operating pinion meshing with said toothed flange and provided with a stem rotatably mounted in the outer end of said pointer arm and having a milled head at its upper end; and a coiled spring on said stem compressed between said plate and head.

17. In a ground speed indicator for flying machines, the combination of a telescope; a reflector prism rotatably mounted at the lower end of the telescope; a supporting bracket on said telescope; a timing apparatus on the bracket and provided with a push button; a fixed shaft on said bracket; a disk support supported on said shaft and operably connected to said reflector; an altitude disk on said support and having an upwardly and inwardly turned graduated flange; a gear ring on said disk and secured to said disk support and provided at its upper part with an outer toothed flange; a shoulder on said support and adapted to operate said button for stopping the timing apparatus; a pointer arm loosely mounted on said fixed shaft and extending over said toothed flange; a bent plate secured to the upper face of the outer end of said pointer arm and disposed over, around, and under said flange and formed with a lug adapted to operate said button to start the timing apparatus, said plate being also formed with a cut-away portion providing a pointer disposed over said peripheral flange; an operating pinion meshing with said toothed flange and provided with a stem rotatably mounted in the outer end of said pointer arm and having a milled head; and a coiled spring on said stem compressed between said plate and head.

18. In a ground speed indicator for flying machines, the combination of a telescope; a supporting bracket thereon; a reflector rotatably mounted on the lower end of the telescope; a timing apparatus on the supporting bracket and provided with a push button; a graduated rotatable altitude disk on said bracket operatively connected with the reflector and having its periphery graduated in numerals of altitude measure; a member secured to said disk adapted to operate said button to stop the timing apparatus when the reflector reflects vertical rays into the telescope; and a stop adjustable on said disk and adapted to operate the push button to start the timing apparatus and provided with a pointer adjacent to the periphery of the disk; said timing apparatus being, from its starting position forward, graduated with speed numerals representing the speed at which an object would move in order to travel a selected distance during the time between the starting of the timing apparatus and the stopping of the timing apparatus.

19. In combination, a sighting instrument; a timing apparatus; and means connected to said instrument and adapted to control the timing apparatus.

20. In a ground speed indicator for flying machines, the combination of a movable sighting instrument; a timing apparatus; and a pawl operatively connected to said instrument, and adapted to stop the timing apparatus.

21. In a ground speed indicator for flying machines, the combination of a movable sighting instrument; a timing apparatus having controlling means; a movable member operatively connected to said instrument; and a pawl pivotally mounted on said member and adapted to engage said means to stop the timing apparatus, said pawl being adapted when moving rearwardly to cam over said means.

22. In a ground speed indicator for flying machines, the combination of a movable sighting instrument; a timing apparatus having a controlling lever; a rotatably supported disk operatively connected to said instrument; and a pawl pivotally mounted on said disk and provided with a forward shoulder adapted when said reflector reflects vertical rays into the telescope to engage said lever to stop the timing apparatus, said pawl being adapted when moving rearwardly to cam over said lever.

23. In a ground speed indicator for flying machines, the combination of a telescope; an adjustable reflector adapted to reflect into the telescope forward and vertical rays; a timing apparatus; a rotatably supported disk support operatively connected to said reflector; an altitude disk on said support; a lever adapted to start and stop said timing apparatus; a pawl pivotally mounted on said support and provided with a forward shoulder adapted when said reflector reflects vertical rays into the telescope to rock said lever and stop the timing apparatus; and a pointer arm adjustably mounted over said disk and adapted to engage and operate said lever for starting the timing apparatus.

24. In a ground speed indicator for flying machines, the combination of a telescope; a reflector associated therewith and adapted to reflect into the telescope forward and vertical incoming rays; a supporting bracket on said telescope; a shaft thereon; a timing apparatus on the supporting bracket and provided with a push button; a circular disk support rotatably supported on said shaft and operatively connected to said reflector; an altitude disk secured on said support; an elbow lever fulcrumed at its elbow part to the lower face of said supporting bracket and adapted to press said push button; a manipulating button mounted on said lever; a pawl pivotally mounted on said support and provided with a forward shoulder adapted when said reflector reflects vertical rays into the telescope, to rock said lever to stop the timing apparatus, said pawl being adapted when moving rearwardly to cam over said lever; and a pointer arm adjustably mounted on said fixed shaft and having a stop adapted to engage and rock said lever to start the timing apparatus.

25. In a ground speed indicator for flying machines, the combination of a telescope; a reflector rotatably mounted at the lower end of the telescope, and adapted to reflect into the telescope forward and vertical incoming rays; a supporting bracket on said telescope; a timing apparatus on the supporting bracket and provided with a push button; a circular disk support rotatably supported on said shaft and operatively connected to said prism; an altitude disk secured on said support; an elbow lever fulcrumed at its elbow part to the lower face of said supporting bracket and adapted to press said push button; a manipulating button mounted on said lever; a pawl pivotally mounted on said support and provided with a forward shoulder adapted when said reflector reflects vertical rays into the telescope, to rock said lever and stop the timing apparatus, said pawl being adapted when moving rearwardly to cam over said lever; and a pointer arm loosely mounted on said fixed shaft and having its point disposed over the periphery of said disk.

26. In a ground speed indicator for flying machines, the combination of a telescope having a housing and a bracket thereon; a reflector rotatably mounted in said housing; a graduated rotatable altitude disk; a rotary member on said bracket and supporting said disk; a connecting spindle having its upper and lower ends rotatably mounted in said bracket and said lower housing respectively and comprising alined spindle sections having their adjacent ends removably spliced together; a coupling sleeve secured to one of said ends and receiving both ends; an operative connection between said member and said upper section; and an operative connection between the lower section and the reflector.

27. In a ground speed indicator for flying machines, the combination of a telescope having a lower housing; a bracket on said telescope; a reversing prism rotatably mounted in said housing and provided with a large gear; a chronograph on the bracket; a graduated rotatable altitude disk on said bracket operatively connected with the chronograph; a fixed shaft on said bracket; a rotary sleeve on said shaft and supporting said disk; a horizontal actuating shaft rotatably mounted in said bracket and having an outer milled head; a connecting spindle having its upper and lower end rotatably mounted in said bracket and said lower housing respectively and comprising alined spindle sections having their adjacent ends removably spliced together; a coupling sleeve secured to one of said ends and receiving both ends; a gear on the lower end of said spindle and meshing with said large gear; and gears connecting said sleeve with the upper part of the spindle; the operative connection between said rotary sleeve and said lower prism being such that any amount of rotation of the sleeve constrains said lower prism to rotate approximately one-eighth that amount.

28. In a ground speed indicator for flying machines, the combination of a telescope having a movable light receiving part; a control means; a support having a shoulder; an actuating shaft rotatably mounted in said support; a head on said shaft; a spring on said head and adapted to engage in said shoulder; an operative connection between said means and actuating shaft; and an operative connection between said means and said part.

29. In a ground speed indicator for flying machines, the combination of a telescope having a housing and a bracket thereon; a reflector rotatably mounted in said housing; a graduated rotatable altitude disk on said bracket; a fixed shaft on said bracket; a rotary sleeve on said shaft and supporting said disk; a boss on the bracket and provided with a depression; a horizontal actuating shaft rotatably mounted in said boss and having an outer milled head; a spring on said head and adapted to engage in said depression; gears operatively connecting said actuating shaft with said sleeve; and an operative connection between said rotary sleeve and said reflector.

30. In a ground speed indicator for flying machines, the combination of a telescope; a housing fixed to the lower part thereof; a reflector prism in said lower housing and adapted to reflect light rays into the telescope; means supporting said reflector comprising journal shafts mounted in said housing; a coiled spring surrounding one of the shafts and having its opposite end secured to said shaft and housing respectively and tending to turn the prism; a rotatable altitude disk; and a chain of gears connecting one of said shafts to said disk.

31. In a ground speed indicator for flying machines, the combination of a telescope; a transverse partly cylindrical housing fixed to the lower part of the telescope casing; a lower reversing prism in said lower housing and adapted to reflect rays into the telescope; a lower sheath supporting said prism and provided with a light inlet opening; journal bearings in said lower housing in the axis thereof; journal shafts mounted in said bearings and supporting said lower sheath; a gear mounted on one of said shafts; a coiled spring surrounding the other shaft and having its opposite end secured to said sheath and housing respectively and tending to turn the prism to position to reflect approximately horizontal rays into the telescope; a timing apparatus; a rotatable altitude disk; a chain of gears connecting said disk to said first named gear; and members on said disk adapted to start and stop the timing apparatus.

32. In a ground speed indicator for flying machines, the combination of an adjustable sighting instrument; an altitude member operatively connected to the instrument; an angle pointer; a gear wheel fixed to said pointer; a graduated fixed angle member; a pinion member comprising a manipulating head, a pinion engaging said gear wheel, and a stem rotatably mounted in the fixed disk; said pinion being movable into or out of operative relation with the gear wheel.

33. In combination, a fixed shaft; an angle pointer loosely mounted on said fixed shaft; a gear wheel loosely mounted on said shaft and fixed to said pointer; a graduated fixed angle disk fixed to said shaft and provided with an opening; a pinion member comprising a manipulating head, a pinion engaging said gear wheel, and a stem engaging in said opening; and a spring disposed between said manipulating head and the fixed disk.

34. In a ground speed indicator for flying machines, the combination of an adjustable sighting instrument; an altitude disk operatively connected to the instrument; a shaft; an angle pointer mounted on said shaft and associated with said altitude disk; a gear wheel fixed to said pointer; a graduated fixed angle disk provided with an opening; a pinion member comprising a manipulating head, a pinion engaging said gear wheel, and a stem engaging in said opening and a spring disposed between said manipulating head and the fixed disk.

35. In a ground speed indicator for flying machines, the combination of an adjustable sighting instrument; an altitude disk operatively connected to the instrument; a fixed shaft; an angle pointer loosely mounted on said fixed shaft; a gear wheel loosely mounted on said shaft and fixed to said pointer; a graduated fixed angle disk fixed to said shaft and provided with an opening; a pinion member comprising a manipulating head, a pinion engaging said gear wheel, and a stem engaging in said opening of the fixed disk; a spring disposed between said manipulating head and the fixed disk; and a member pivotally mounted on said altitude disk and adapted to engage in said angle pointer.

36. In a ground speed indicator for flying machines, the combination of a telescope provided with a level device; a reflector rotatably mounted on the lower end of the telescope and adapted to reflect into the telescope forward and vertical incoming rays; a supporting bracket on said telescope; an altitude disk on said bracket operatively connected to the reflector; a fixed shaft on said bracket; an angle pointer loosely mounted on said fixed shaft and provided with a notch and having an upwardly and inwardly pointed end; a gear wheel loosely mounted on said shaft and fixed to said pointer; a fixed angle disk fixed to said shaft above said gear wheel and provided with an opening and having its periphery disposed adjacent to said pointed end; a pinion member comprising a manipulating head, a pinion engaging said gear wheel, and a stem engaging in said eccentric opening of the fixed disk; a spring disposed between said manipulating head and the fixed disk; a snap member pivotally mounted on said altitude disk and adapted to engage in said notch of the angle pointer and adapted to be moved out of operative relation with the angle pointer; and graduations on fixed angle disk for measuring the angle between the axis of the telescope and the light rays reflected by the reflector into the telescope.

37. In a ground speed indicator for flying machines, the combination of a telescope; a rotatably mounted reflector adapted to reflect rays into the telescope; an altitude disk operatively connected to the reflector; a fixed angle disk; an adjustable pointer on said disk; a member on said altitude disk and adapted to engage said pointer; and graduations on the fixed angle disk for measuring the angle of movement of the reflector.

38. In a ground speed indicator for flying machines, the combination of a telescope; a reflector rotatably mounted on the telescope and adapted to reflect into the telescope forward and vertical incoming rays; an altitude disk operatively connected to the prism; a fixed shaft coaxial with said disk; an angle pointer loosely mounted on said fixed shaft and provided with a notch; a snap member pivotally mounted on said altitude disk substantially over said pawl and adapted to engage in said notch pointer; and graduations on fixed angle disk for measuring the angle between the axis of the telescope and the light rays reflected by the reflector into the telescope.

39. In a ground speed indicator for flying machines, the combination of a telescope; a supporting bracket provided with a concaved recess; a chronograph mounted in said concaved recess; a strap secured at one end of said concaved recess and surrounding the chronograph; a clamping device secured to the other end of the strap for clamping to the supporting bracket; a reflector rotatably mounted on the telescope; an altitude disk on said bracket and operatively connected with the reflector and adapted to start and stop the chronograph.

40. In a ground speed indicator for flying machines, the combination of a telescope; a supporting bracket provided with a semi-cylindrical recess adapted to receive the upper part of said telescope; a strap piece pivoted to said bracket at one side of said semi-cylindrical recess and provided at its opposite end with a lug provided with a bore; a coöperating lug on said supporting brackets near said first named lug and provided with a bore alined with said first named bore; a clamping bolt passing through said bores; a reflector rotatably mounted on the telescope; and a disk on said bracket operatively connected with the reflector.

41. In a ground speed indicator for flying machines, the combination of a telescope; a supporting bracket provided with a concaved recess, and a semi-cylindrical recess adapted to receive the upper part of said telescope; a strap piece secured to said bracket at opposite sides of said semi-cylindrical recess and holding the telescope therein; a chronograph mounted in said concaved recess; a strap secured at opposite ends of said concaved recess and surrounding the chronograph; a reflector rotatably mounted on the telescope; and a graduated rotatable altitude disk on said bracket operatively connected with the reflector and adapted to start and stop the chronograph.

42. In a ground speed indicator for flying machines, the combination of a telescope; a supporting bracket provided with a concaved recess, and with a semi-cylindrical recess adapted to receive the upper part of said telescope; a strap piece pivoted to said bracket at one side of said semi-cylindrical recess and provided at its opposite end with a lug provided with a bore; a coöperating lug on said supporting brackets near said first named lug and provided with a bore alined with said first named bore; a clamping bolt passing through said bores; a timing apparatus mounted in said concaved recess and provided with a push button for stopping, starting and zeroizing the chronograph; a strap secured at one end of said concaved recess and surrounding the timing apparatus; a clamping device secured to the other end of the strap for clamping to the supporting bracket; a reversing prism rotatably mounted on the lower end of the telescope; a graduated rotatable altitude disk on said bracket operatively connected with the prism; and members on said disk adapted to engage said button to start and stop the timing apparatus.

BARTON A. PROCTOR.

Witnesses:
H. M. KILPATRICK,
H. D. PENNEY.